United States Patent [19]

Sachs

[11] Patent Number: 5,502,829
[45] Date of Patent: Mar. 26, 1996

[54] APPARATUS FOR OBTAINING DATA FROM A TRANSLATION MEMORY BASED ON CARRY SIGNAL FROM ADDER

[75] Inventor: Howard G. Sachs, Belvedere, Calif.

[73] Assignee: Intergraph Corporation, Huntsville, Ala.

[21] Appl. No.: 148,219

[22] Filed: Nov. 3, 1993

[51] Int. Cl.$^6$ .................................................. G06F 12/10
[52] U.S. Cl. ..................................... 395/417; 364/DIG. 1
[58] Field of Search ..................................... 395/400, 417

[56] References Cited

U.S. PATENT DOCUMENTS

| 3,768,080 | 10/1973 | Boger et al. | 395/400 |
|---|---|---|---|
| 4,218,743 | 8/1980 | Hoffman et al. | 395/400 |
| 4,837,738 | 6/1989 | Lemay et al. | 395/400 |
| 5,150,471 | 9/1992 | Tipon et al. | 395/400 |
| 5,335,333 | 8/1994 | Hinton et al. | 395/400 |
| 5,347,636 | 9/1994 | Ooi et al. | 395/400 X |

Primary Examiner—Michael A. Whitfield
Attorney, Agent, or Firm—Townsend and Townsend and Crew

[57] ABSTRACT

An adder adds a displacement address to a base address to generate a virtual address. The adder includes carry indicating circuitry for generating a carry indicating signal indicating whether the addition of the displacement address to the base address resulted in a carry. Addressing circuitry addresses the translation memory with a subset of bits from the base address so that the translation memory outputs multiple address translation entries simultaneously. At approximately the same time the translation memory outputs the multiple address translation entries, the adder completes the addition of the displacement address to the base address and generates the carry indicating signal. A multiplexer selects one of the address translations output from the translation memory in response to the carry indicating signal.

21 Claims, 2 Drawing Sheets 5,502,829

APPARATUS FOR OBTAINING DATA FROM A TRANSLATION MEMORY BASED ON CARRY SIGNAL FROM ADDER

BACKGROUND OF THE INVENTION

This invention relates to computing systems, and, more particularly, to an apparatus for translating virtual addresses to physical addresses.

Many modern computing systems operate on large uniform virtual address spaces that greatly exceed the amount of physical memory actually present in any given machine configuration. For example, 32-bit byte-addressed CPU's generally have a uniform virtual address space of $2^{32}$ bytes or 4 gigabytes. On the other hand, the amount of physical memory supported by such machines typically ranges anywhere from 1 to 256 megabytes. Consequently, each memory access requires that the virtual address supplied by the CPU be translated (mapped) into a physical (or real) address that references an actual location in memory. Since the translation process is both relatively lengthy (it consumes many CPU cycles), and since the same address will often be used many times, it is common practice to store mapped pairs of virtual and real addresses in a special cache memory called a translation lookaside buffer (TLB). Virtual addresses supplied by the CPU are checked against the TLB to see if a virtual/real address translation is already stored in the TLB for a given virtual address. If so, then the translation information is obtained directly from the TLB, and the usual translation process is avoided.

FIG. 1 shows a known apparatus 10 for translating 32-bit virtual addresses to 32-bit physical byte addresses. Apparatus 10 includes a register file 14 which, in this embodiment, is a 32-bit wide register file. One or more registers 16 within register file 14 (referred to in a memory reference instruction) may store a base address value used in a virtual address calculation. The base address is communicated to an adder 18 over a communication path 22. Adder 18 also receives a displacement address (from the memory reference instruction) over a communication path 26. Adder 18 adds the displacement address to the base address to produce the 32-bit virtual address on a communication path 30.

The 32-bit virtual address output on communication path 30 conceptually may be split into three parts. First, assume the computing system's physical memory is divided into fixed length pages of $2^{12}$ or 4 kilobytes (KB) each. Thus, for a 4 KB page, 12 bits are needed to address a specific byte in a page. The least significant bits of the virtual address (bits [11:0] in this example) appearing on a communication path 31 may constitute the page displacement portion of the address. These bits need no translation, as they are the same in both the virtual and the real address (VA=RA). Consequently, they may be ignored during the translation process. The middle bits of the virtual address appearing on a communication path 38 (termed the virtual page address) are used to select an entry 40 in TLB 34. The number of bits comprising the virtual page address is a function of the number of entries in TLB 34. For a 64 entry TLB, 6 bits are needed to select one of the entries. Thus, in this case, bits [17:12] are used to address TLB 34. Of course, if TLB 34 contained 128 entries, then TLB 34 would be addressed by 7 bits, and so on. The remaining high order bits (bits [31:18], termed the virtual segment address) are used in the address translation process in the manner discussed below.

Each TLB entry 40 includes a virtual address tag field 42, a real address field 46, and a control field 50. The virtual address tag field 42 typically comprises bits [31:18] of the virtual address corresponding to real address bits [31:12] stored in real address field 46. Control field 50 typically includes access control bits, valid bits, used bits, etc. When TLB 34 is addressed by bits [17:12] of the virtual address on communication path 38, the addressed virtual address tag is communicated to a comparator 54 over a communication path 58. At the same time, bits [31:18] of the virtual address are communicated to comparator 54 over a communication path 62. If the bits match, then a TLB hit signal is provided on a communication path 66. On the other hand, if the bits do not match, then comparator 54 generates a miss signal on communication path 66. If a hit signal is generated on communication path 66, then the addressed entry in TLB 34 contains the address translation information for the requested virtual address, and the real address bits [31:12] in real address field 46 are output on a communication path 70 and concatenated with the VA=RA low order bits of the virtual address (i.e., bits [11:0]) by a real address circuit 71 to form the 32 bit real address RA [31:0] on a communication path 78. The real address then may be used to access the memory.

If a miss signal is generated by comparator 54 on communication path 66, then the virtual address is communicated to a dynamic translation unit (DTU) 82 over a communication path 86 to begin the much slower process of translating the virtual address by accessing page tables stored in main memory. When this "dynamic" translation is completed, TLB 34 will be updated with the newly translated virtual/physical address pair (displacing one of the current entries, if necessary), for a quick reference via TLB lookup should it be used again.

While a TLB lookup (unlike the many-cycle translation process itself) provides a relatively quick way to get a particular virtual-to-physical address mapping, nevertheless, as processor clock speeds increase past 100 MHz, the time needed to access the TLB itself becomes part of the critical path in the machine's operation. Since the TLB is on the critical path for all memory accesses (supplying both source addresses for data or instructions to be loaded from, and destination addresses for data to be stored at), the rate at which the TLB runs ultimately affects the rate at which the entire machine can run.

From inspection of FIG. 1, it should be apparent that a major slowdown in accessing TLB 34 is the 32-bit add that must be performed by adder 18 on the register plus displacement values contained in the memory reference instruction to generate the full 32-bit virtual address. Even using advanced CMOS circuitry, performing a 32-bit add takes considerable time, and access to TLB 34 cannot even begin until the addition is completed. Thus, improvements in the mechanisms for obtaining data from TLB 34 is highly desirable.

SUMMARY OF THE INVENTION

The present invention is directed to an apparatus for obtaining data from a translation memory, such as a TLB, by accessing the TLB at the same time that the virtual address calculation is taking place. In one embodiment of the present invention, an adder adds a displacement address to a base address to generate a virtual address. The adder includes carry indicating circuitry for generating a carry indicating signal indicating whether the addition of the displacement address to the base address resulted in a carry. Addressing circuitry addresses the translation memory with a subset of bits from the base address so that the translation memory outputs multiple address translation entries simultaneously. At approximately the same time the translation memory outputs the multiple address translation entries, the adder completes the addition of the displacement address to the base address and generates the carry indicating signal. A multiplexer selects one of the address translations output from the translation memory in response to the carry indicating signal.

DESCRIPTION OF THE PREFERRED EMBODIMENTS

Figure 1:
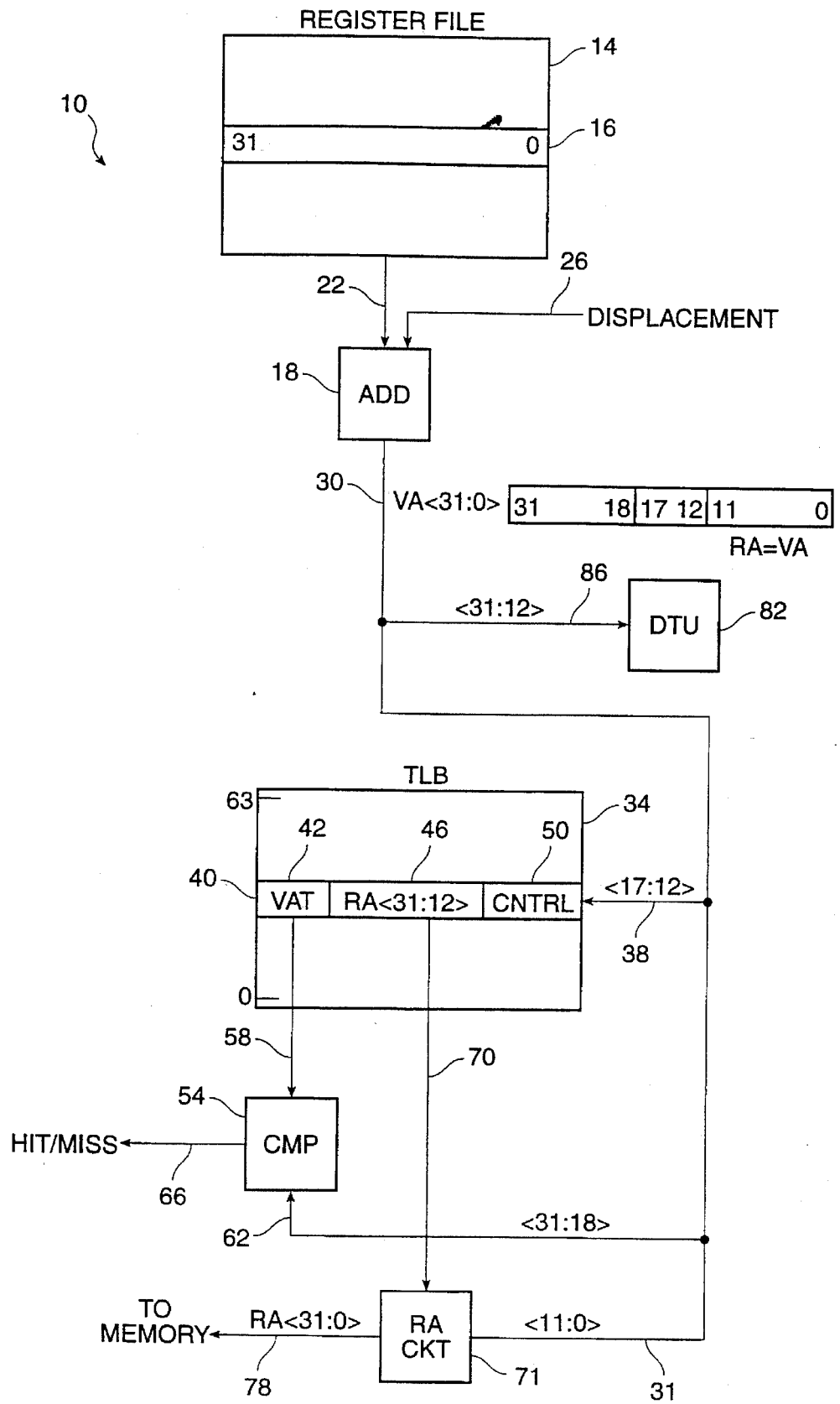
FIG. 1 is a block diagram showing a known mechanism for obtaining data from a translation memory.
Figure 2:
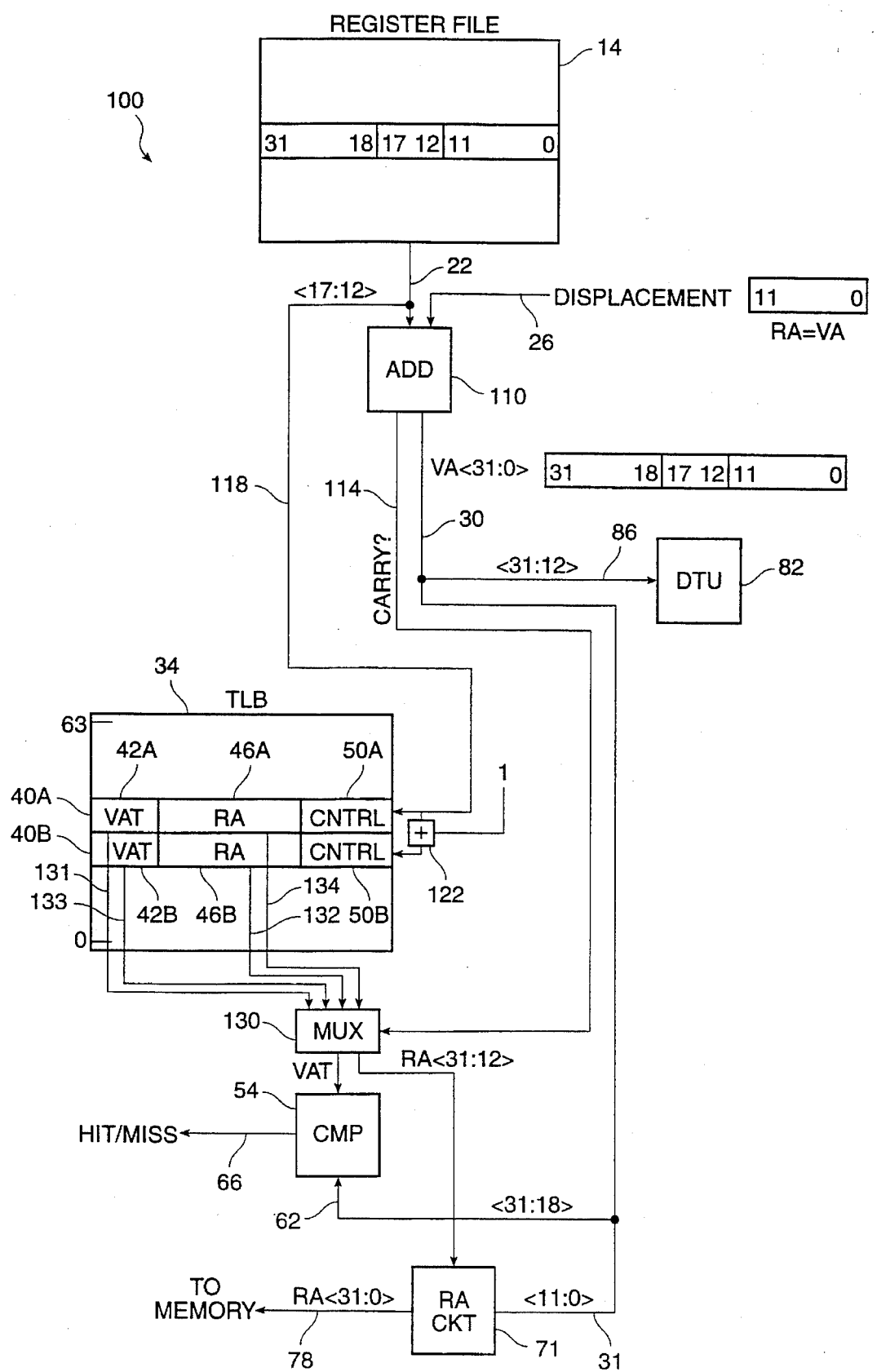
FIG. 2 is a block diagram of a particular embodiment of an apparatus according to the present invention for obtaining data from a translation memory.

FIG. 2 is a block diagram of a particular embodiment of an apparatus 100 according to the present invention for obtaining data from a translation memory. Some of the components used in apparatus 10 of FIG. 1 are also used in apparatus 100, and their numbering remains the same.

Assume apparatus 100 operates in a computing system which organizes data in 4 KB pages and that TLB 34 contains 64 entries much like apparatus 10 of FIG. 1. In apparatus 100, the displacement address is limited to be no larger than the VA=RA page displacement portion of the virtual address (however many bits that may be). Thus, for 4 KB pages, the displacement address is no larger than 12 bits. An adder 110 adds the displacement address received over communication path 26 to the base address received over communication path 22 and provides the 32 bit virtual address on a communication path 30 much like adder 18 of FIG. 1. In addition to the calculated virtual address, adder 110 generates a carry signal on a communication path 114 for indicating whether the addition of the displacement address to the base address resulted in a carry. Unlike apparatus 10 shown in FIG. 1, bits [17:12] of the calculated virtual address are not used to access TLB 34. Instead, bits [17:12] of the base address (termed the base page address) are communicated to TLB 34 over a communication path 118 for directly addressing one of the translation entries 40A therein. Bits [17:12] of the base address are also communicated to an adder 122 which increments the address value by 1 and uses the resulting value to address a second entry 40B within TLB 34. That is, the entry in TLB 34 addressed by bits [17:12] of the base address is accessed simultaneously with the next succeeding entry in TLB 34. The virtual address tag 42A and real address tag 46A addressed by the value on communication path 118 together with the virtual address tag 42B and real address tag 46B addressed by adder 122 are communicated to a multiplexer 130 over respective communication paths 131, 132, 133, and 134.

Since the displacement address is no larger than the lower VA=RA page displacement portion of the virtual address, adding the displacement address to the base address at most results in a carry in the bit [12] position. Consequently, the effect of the addition will be at most to increase the value of bits [17:12] of the base address by one. Thus, by accessing TLB 34 with bits [17:12] of the base address and simultaneously accessing the next succeeding entry in TLB 34 ensures that one of the entries output by TLB 34 corresponds to the entry that would have been requested had TLB 34 been accessed with bits [17:12] of the calculated virtual address. The carry indicating signal on communication path 114 thus may be communicated to multiplexer 130 and used to select the proper translation entry, and the virtual address tag portion of the selected entry is communicated to comparator 54. As in apparatus 10 of FIG. 1, if the selected virtual address tag matches bits [31:18] of the calculated virtual address, then comparator 54 generates a hit signal on communication path 66, and the value in the real address field of the selected entry is concatenated with the VA=RA low order bits of the calculated virtual address by real address circuit 71 to form the 32-bit real address on communication path 78. If the selected virtual address tag does not match, then comparator 54 generates a miss signal, and bits [31:12] of the calculated virtual address are communicated to DTU 82 for translation to a real address.

Since the additional steps required by apparatus 100, i.e., selecting two entries in the TLB and selecting the correct one after the carry on bit [11] is decided, are overlapped with the 32-bit addition of the base plus displacement values, they effectively take no additional time. Since selection of an entry in TLB 34 is completed by the time the add is completed (rather than merely beginning TLB access at that time), the overall result is a significant reduction in the total amount of time occupied by a TLB lookup.

While the above is a complete description of a preferred embodiment of the present invention, various modifications may be employed. For example, the present invention should not be limited by whether the processor uses 32-bits, 64-bits, etc., on the width of its register file, on the length of its addresses, on the size of the page used in its physical memory, or in the number of entries in its TLB. Consequently, the scope of the invention should be ascertained by the appended claims.

What is claimed is:

1. In a computing system having an addressable translation memory for translating virtual addresses, the virtual addresses being formed by adding a displacement address to a base address, an apparatus for obtaining data from the translation memory comprising:

a first adder for adding the displacement address to the base address, the adder including carry indicating circuitry for generating a carry indicating signal indicating whether the addition of the displacement address to the base address results in a carry;

addressing circuitry, coupled to the translation memory, for addressing the translation memory with a subset of bits from the base address so that the translation memory outputs multiple address translation entries substantially simultaneously; and a multiplexer, coupled to the translation memory and to the carry indicating circuitry, for selecting one of the address translations output from the translation memory in response to the carry indicating signal.

2. The apparatus according to claim 1 wherein the computing system groups data into pages, wherein each base address includes a base displacement address and a base page address, and wherein the subset of bits from the base address comprises the base page address.

3. The apparatus according to claim 2 wherein the first adder adds the displacement address to the base displacement address.

4. The apparatus according to claim 3 wherein the number of bits comprising the displacement address equals the number of bits comprising the base displacement address.

5. The apparatus according to claim 4 wherein the base displacement address is concatenated to the base page address.

6. The apparatus according to claim 5 wherein each address translation entry comprises a virtual address tag and a real address.

7. The apparatus according to claim 6 wherein the virtual address comprises:

a virtual segment address;

a virtual page address; and a virtual page displacement address.

8. The apparatus according to claim 7 further comprising a comparator, coupled to the multiplexer and to the first adder, for comparing the virtual segment address to the virtual address tag, the comparator generating a hit signal when the virtual segment address matches the virtual address tag, and the comparator generating a miss signal when the virtual segment address does not match the virtual address tag.

9. The apparatus according to claim 8 further comprising real address circuitry, coupled to the first adder and to the multiplexer, for concatenating the virtual address tag with the virtual displacement address to form the real address.

10. The apparatus according to claim 9 further comprising dynamic address translation circuitry, coupled to the comparator and to the first adder, for accessing a main memory with the virtual segment address and the virtual page address in response to the miss signal to obtain information for translating the virtual address to the real address.

11. The apparatus according to claim 1 wherein the addressing circuitry comprises:

first entry addressing circuitry for addressing the translation memory with a subset of bits from the base address, the subset of bits forming a first translation address;

wherein the translation memory includes first translation output circuitry for outputting first translation data in response to the first translation address;

a second adder for adding a selected value to the subset of bits from the base address to produce a second translation address;

second entry addressing circuitry for addressing the translation memory with the second translation address;

wherein the translation memory includes second translation output circuitry for outputting second translation data in response to the second translation address;

wherein the first entry addressing circuitry and the second entry addressing circuitry simultaneously address the translation memory.

12. The apparatus according to claim 11 wherein the computing system groups data into pages, wherein each base address includes a base displacement address and a base page address, and wherein the subset of bits from the base address comprises the base page address.

13. The apparatus according to claim 12 wherein the first adder adds the displacement address to the base displacement address.

14. The apparatus according to claim 13 wherein the number of bits comprising the displacement address equals the number of bits comprising the base displacement address.

15. The apparatus according to claim 14 wherein the selected value equals one.

16. The apparatus according to claim 15 wherein the base displacement address is concatenated to the base page address.

17. The apparatus according to claim 1 wherein each address translation entry comprises a virtual address tag and a real address.

18. The apparatus according to claim 17 wherein the virtual address comprises:

a virtual segment address;

a virtual page address; and a virtual page displacement address.

19. The apparatus according to claim 18 further comprising a comparator, coupled to the multiplexer and to the first adder, for comparing the virtual segment address to the virtual address tag, the comparator generating a hit signal when the virtual segment address matches the virtual address tag, and the comparator generating a miss signal when the virtual segment address does not match the virtual address tag.

20. The apparatus according to claim 19 further comprising real address circuitry, coupled to the first adder and to the comparator, for concatenating the virtual address tag with the virtual displacement address to form the real address in response to the hit signal.

21. The apparatus according to claim 20 further comprising dynamic address translation circuitry, coupled to the comparator and to the first adder, for accessing a main memory with the virtual segment address and the virtual page address in response to the miss signal to obtain information for translating the virtual address to the real address.

* * * * *